Aug. 22, 1961   G. LAZAROWICZ   2,996,929
BEVEL GEAR TRANSMISSION WITH BACK-LASH CONTROL
Filed Nov. 20, 1959
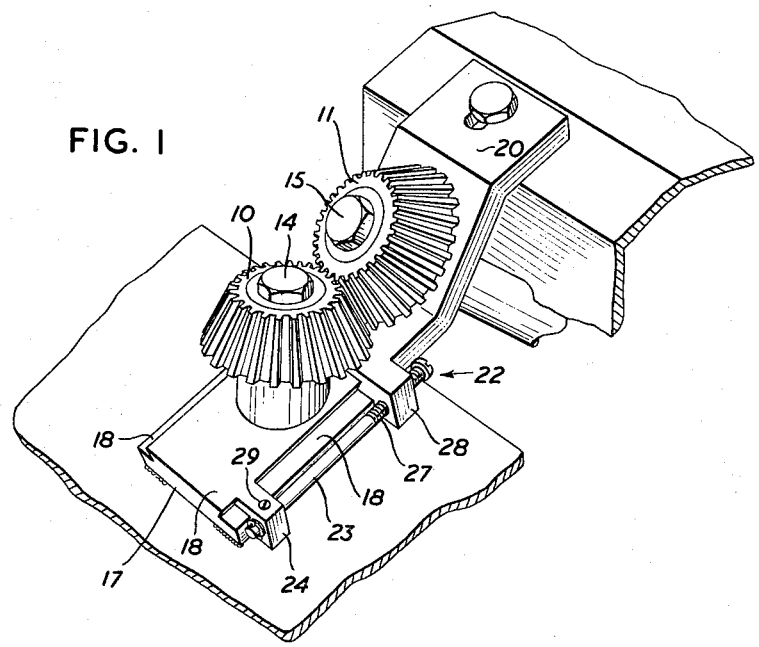
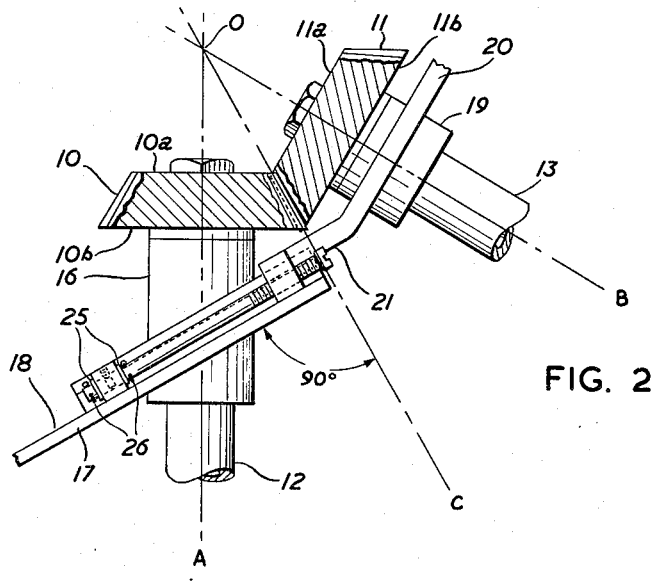
INVENTOR
G. LAZAROWICZ
BY: Maybee & Legris
ATTORNEYS United States Patent Office 2,996,929
Patented Aug. 22, 1961

2,996,929
BEVEL GEAR TRANSMISSION WITH
BACK-LASH CONTROL
Gustaw Lazarowicz, Toronto, Ontario, Canada, assignor to Orenda Engines Limited, Malton, Peel, Ontario, Canada, a corporation
Filed Nov. 20, 1959, Ser. No. 854,395
4 Claims. (Cl. 74—409)

The present invention relates to bevel gear transmissions and, in particular, to mounting means for such bevel gear transmissions.

In bevel gear transmissions of the prior art, one of the problems which has been encountered is the provision of some means to eliminate or reduce the back-lash which almost inevitably occurs in such gear systems. The problem of gear back-lash is not, of course, confined to bevel gear transmission systems but is present in all gear systems as a result of the necessary clearances between moving parts and the increase in these clearances as a result of wear.

In prior systems which have employed spur gears, it has been common practice to adjust the positions of the gears to control or eliminate back-lash by moving one gear relative to another in a direction radially of one gear. This in effect moves the parallel axes of the spur gears closer together or farther apart so as to adjust the back-lash in the gear system.

In bevel gear transmission systems it has been the practice to employ shims which are used to move one bevel gear relative to another bevel gear in a direction axially of the said one bevel gear. Due to the conical configuration of such gears, the movement of one gear axially relative to the other brings the gears into closer mesh with one another or, alternatively, increases the separation between the gears depending upon the sense of the axial direction.

This latter method of adjusting for back-lash in bevel gear transmissions has the disadvantage that if one gear is moved axially relative to another, the tooth bedding is affected since the generating lines of corresponding teeth flanks do not pass any longer through a common point of origin.

The primary object of this invention is to provide a bevel gear transmission system in which back-lash control is achieved without resorting to shimming or other means which utilize the axial adjustment of individual gears.

Other advantages and objects of the invention will become apparent from the following description when read in conjunction with the accompanying drawings in which:

FIGURE 1 is a perspective view of a double gear transmission system embodying the present invention, and FIGURE 2 is a side elevation, partly in section of the transmission system of FIGURE 1.

Referring now to FIGURE 1, it will be seen that two bevel gears 10 and 11 are secured on their respective shafts 12 and 13 (see FIGURE 2), by conventional means which may include nuts 14 and 15. The gear 10, as can be seen in FIGURE 2, rotates about axis O—A and bevel gear 11 rotates about axis O—B. The line along which the two gears engage one another is referred to as "gears pitch cone line" and this line is indicated in FIGURE 2 by the line O—C.

Gear 10 and its associated shaft 12 are journalled for rotation about axis O—A in a bearing sleeve 16 which is carried in a mounting block 17 which, as can be seen in FIGURES 1 and 2, has a surface 18 which is normal to the gears pitch cone line O—C.

The gear 11 and its associated shaft 13 are mounted for rotation in bearing sleeve 19 which is carried in a second mounting block 20. The second mounting block 20 is also provided with a surface normal to the gears pitch cone line O—C and this surface 21 is adapted to lie on the surface 18 of the first mounting block 17 and means 22 are provided operatively connecting the first and second mounting blocks so as to be capable of adjusting the mounting blocks and hence the gears towards or away from each other in a direction normal to the gears pitch cone line.

The means 22 include a lead screw 23 which is carried by an extension 24 of the first mounting block 17 and which is journalled for rotation therein but which is restrained against axial displacement relative to the extension 24 by means of washers 25 and cotter pins 26. The lead screw 23 is threaded at 27 over a portion of its length and this threaded portion is operatively engaged with internal threads in a bore in an extension 28 of the second mounting block 20. A set screw 29 is provided to lock the lead screw 23 against accidental rotation.

If, after the gears have been run for some considerable time, an appreciable amount of wear results and it is necessary to adjust the positions of the gears to accommodate the back-lash and play in the system, it will be clear that the practice of the prior art cannot be successfully employed.

By advancing one gear relative to another along its axis of rotation, a thicker portion of the gear teeth on one gear would be moved out of registry with the corresponding point on the other gear and engaged with a narrower tooth space of the other gear thus reducing the back-lash. However, the line contact of corresponding tooth flanks is then reduced to a point contact and the tooth bedding area is shifted towards an end face which would result in an increase of bending stresses and surface pressure which would be detrimental to the service life of the gear system.

However, by practicing the present invention the gears are adjusted towards or away from each other along the line which is at right angles to the gears pitch cone line O—C and, as a result, the tooth bedding is not affected and a considerable amount of slack, back-lash and play can be eliminated from the system while maintaining the tooth bedding at a correct central position.

A further important feature of this invention is the simplicity of performing the back-lash adjustment which may be accomplished without disassembling the gear bearing which would be a necessity if shims were used.

It is to be appreciated that minor modifications can be made within the spirit of the present invention without departing therefrom. It is contemplated that minor modifications of the specific structure can be made and it is intended that the appended claims be read as including such modifications which do not depart from the inventive concept.

What I claim as my invention is:

1. A back-lash and tooth bedding control for a gear assembly comprising two bevel gears in meshing engagement, each gear having teeth, the cross sectional form of which is wedge-shaped, each gear having an axis of rotation and the gears having a common pitch cone line, a first mounting block for one gear, the mounting block having a surface normal to the gear pitch cone line, a second mounting block for the second gear, the second mounting block having a surface normal to the gear pitch cone line and adapted to lie on and in engagement with the said surface of the first mounting block, and adjustment means operatively connecting the first and second mounting blocks so as to be capable of adjusting the mounting blocks and hence the gears towards or away from each other in a direction normal to the gear pitch cone line.

2. A back-lash and tooth bedding control for a gear assembly as claimed in claim 1 in which the first mounting block is fixed and the second mounting block is movable relative thereto.

3. A back-lash and tooth bedding control for a gear assembly as claimed in claim 1 in which the surface on the first mounting block and the surface on the second mounting block is normal to the gears pitch cone line and together constitute a keyway and slide.

4. A back-lash and tooth bedding control for a gear assembly as claimed in claim 1 in which the adjusting means operatively connecting the first and second mounting blocks includes a lead screw mounted in one mounting block for rotation therein but restrained against axial movement relative thereto and threadably engaged in the other mounting block so that by rotating the lead screw the mounting blocks may be moved closer together or farther apart to adjust the position of the gears and including a set screw to lock the lead screw against accidental rotation.

References Cited in the file of this patent

UNITED STATES PATENTS

| 313,137 | Matteson | Mar. 3, 1885 |
| 1,082,105 | Anderson | Dec. 23, 1913 |
| 2,156,581 | Campbell | May 2, 1939 |
| 2,435,122 | Berndt | Jan. 27, 1948 |
| 2,662,465 | Beer | Dec. 15, 1953 |

FOREIGN PATENTS

| 713,847 | Great Britain | Aug. 18, 1954 |
| 332,857 | Switzerland | Nov. 15, 1958 |